Sept. 22, 1970     T. H. KEOGH ET AL     3,530,418

HIGH VOLTAGE DRAWOUT FUSE ARRANGEMENT FOR INDOOR POWER CENTER

Filed Oct. 18, 1968     6 Sheets—Sheet 1

Inventors
Thomas H. Keogh
Adolph E. Kampit
By Lee H. Kaiser
Attorney

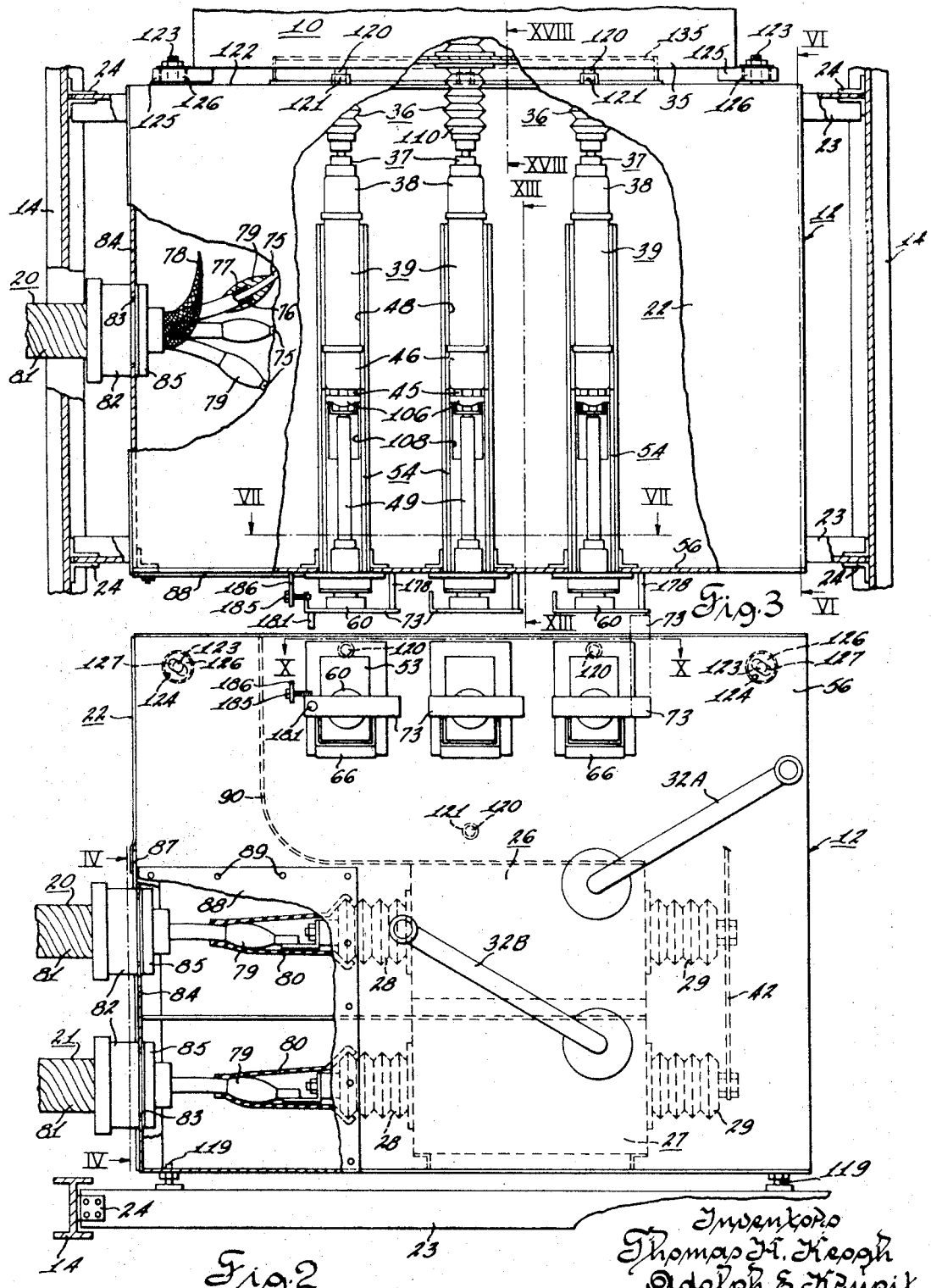

Inventors
Thomas H. Keogh
Adolph E. Kampik
By Lee H Kaiser
Attorney

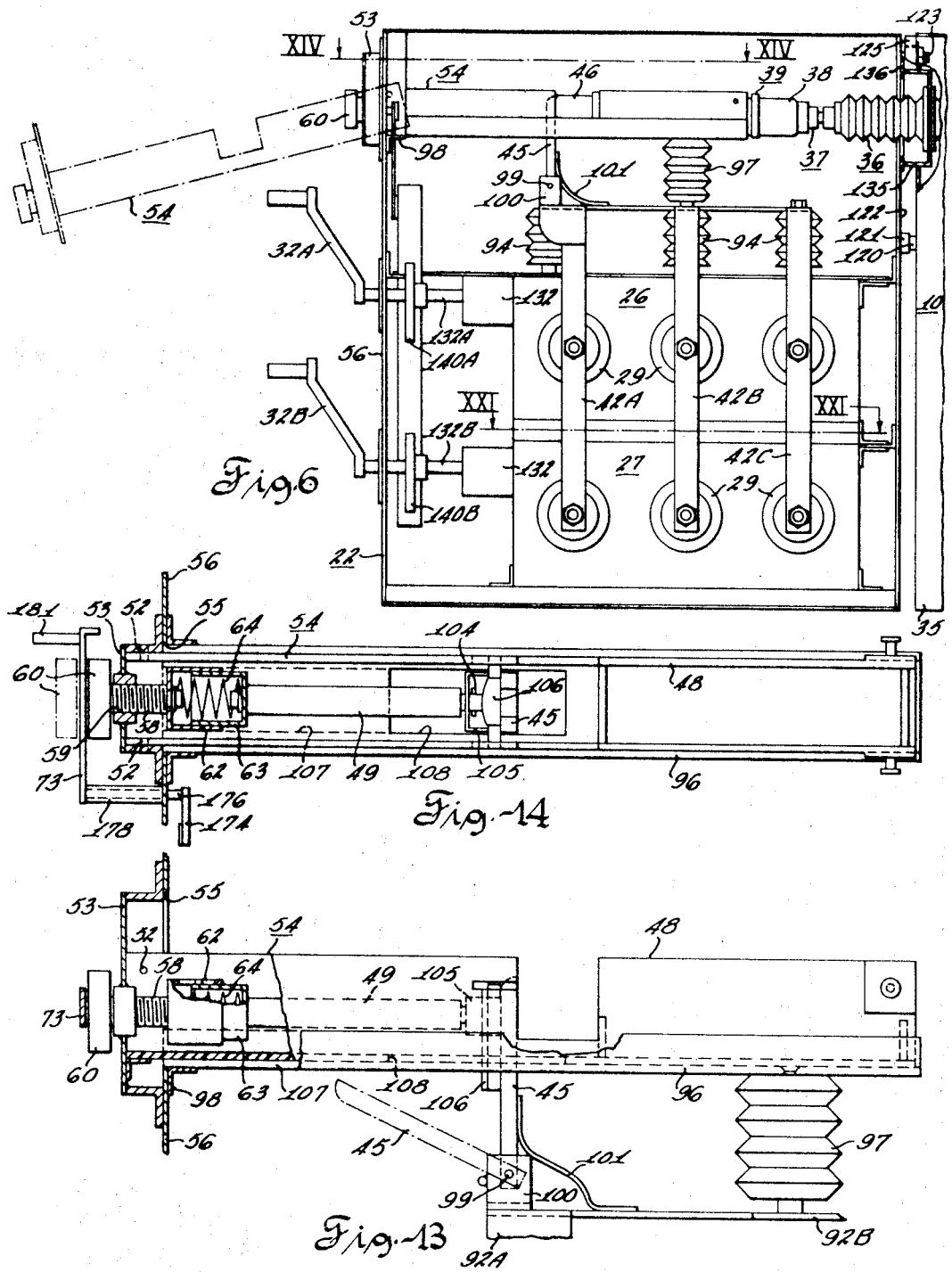

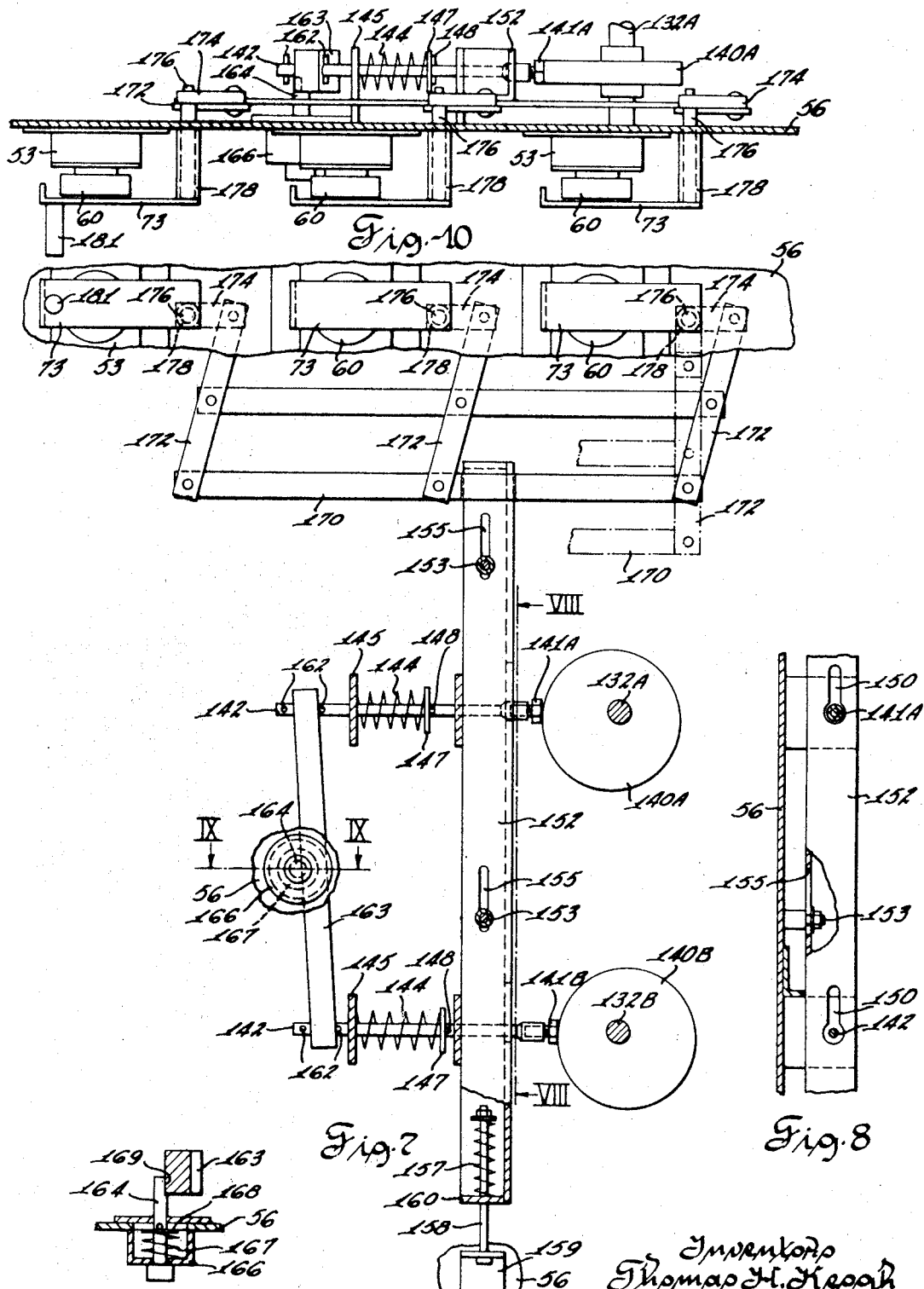

United States Patent Office 3,530,418
Patented Sept. 22, 1970

3,530,418
**HIGH VOLTAGE DRAWOUT FUSE ARRANGE-
MENT FOR INDOOR POWER CENTER**
Thomas H. Keogh, Pittsburgh, and Adolph E. Krupit,
Allison Park, Pa., assignors to Allis-Chalmers Manu-
facturing Company, Milwaukee, Wis.
Filed Oct. 18, 1968, Ser. No. 768,816
Int. Cl. H01h 85/22, 85/36, 85/60
U.S. Cl. 337—194                    19 Claims

ABSTRACT OF THE DISCLOSURE

An indoor power center has circuit breakers from a plurality of high voltage feeder sources, high voltage fuses supported on horizontal drawout fuse drawers in alignment with insulating bushings extending horizontally from an electrical transformer, pivoted connector bars electrically connected to the circuit breakers and engaging one end of the fuses, latching means for the fuse drawers, and fuse clamping means manually operable after the drawers are closed to resiliently push the connector bars against the fuses to move them longitudinally and press the opposite end of the fuses against the transformer insulating bushings. The fuse clamping means prevent release of the latching means and withdrawal of the fuse drawers until clamping pressure is removed from the fuses. Universal motion terminal means on the transformer insulating bushings compensate for misalignment between fuses and bushings.

---

This invention relates to indoor power centers, or unit substations which combine transformers and switchgear to supply electrical power at centers of load from high voltage sources stepped down to service voltage, and in particular it relates to a unitary assembly of terminating means for cables from a plurality of primary feeder sources, circuit breakers for the primary feeders, an electrical transformer, and primary protective equipment between circuit breakers and transformer for such a load center.

Indoor unit substations, termed power centers, using metalclad switchgear associated with air-insulated or noninflammable liquid-filled transformers are known for application in industrial plants having large floor space for installation of the substation. Electrical power is usually transmitted at high potential such as 15,000 volts to the power center where it is transformed to supply secondary distribution at 2300 volts or to supply concentrated centers of load with power at service voltages such as 440 volts. Often the functions of transformation, regulation, protection, control and metering of electrical power are combined in a completely enclosed, factory assembled unit substation, but many industrial plants do not have sufficient floor space for such a unit substation, and known components to perform such functions as transformation and control are too heavy and bulky to permit mounting in an overhead location in an industrial plant for the purpose of conserving floor space in the plant.

It is an object of the invention to provide an indoor power center having a novel arrangement of an electrical transformer and high voltage protective means which connect the circuit breakers to the transformer that permits the power center to be substantially smaller and lighter in weight than any known arrangement and which is sufficiently reduced in size and weight to permit overhead mounting in an indoor location in an industrial plant.

It is a specific object of the invention to provide a novel arrangement for an indoor power center of an electrical transformer, high voltage drawout fuses which connect the circuit breakers to the transformer and directly engage the transformer insulating bushings, clamping means for the fuses, and latching means for the fuse drawers which permits horizontal mounting of the fuses in alignment with the transformer bushings and eliminates mounting clips for the fuses and bus bar connections between transformer and fuses. Another object is to provide such an arrangement having novel self-aligning terminal means on the transformer bushings which directly engage the fuse ferrules in high pressure contact and compensate for any misalignment between fuses and bushings. Still another object is to provide such an arrangement having improved means for mounting and clamping the high voltage fuses which latches the drawout drawers until clamping pressure is removed from the fuses and permits easy installation and removal of the fuses without danger to operating personnel.

These and other objects and advantages of the invention will be more readily apparent from the following detailed description when considered in conjunction with the accompanying drawings wherein:

FIG. 2 is a front view of the embodiment of the invention shown in FIG. 1 with a portion of the front wall broken away to illustrate the internal construction;

FIG. 3 is a plan view of the apparatus of FIG. 2 with a portion of the cover broken away;

FIG. 6 is a view taken along line VI—VI of FIG. 3;

FIG. 7 is a view taken along line VII—VII of FIG. 3;

FIG. 8 is a view taken along line VIII—VIII of FIG. 7;

FIG. 9 is a view taken along line IX—IX of FIG. 7;

FIG. 10 is a view taken along line X—X of FIG. 2;

FIG. 13 is a view taken along line XIII—XIII of FIG. 3 with the fuse removed;

FIG. 14 is a view taken along line XIV—XIV of FIG. 6 with the fuse removed;

Figure 1:
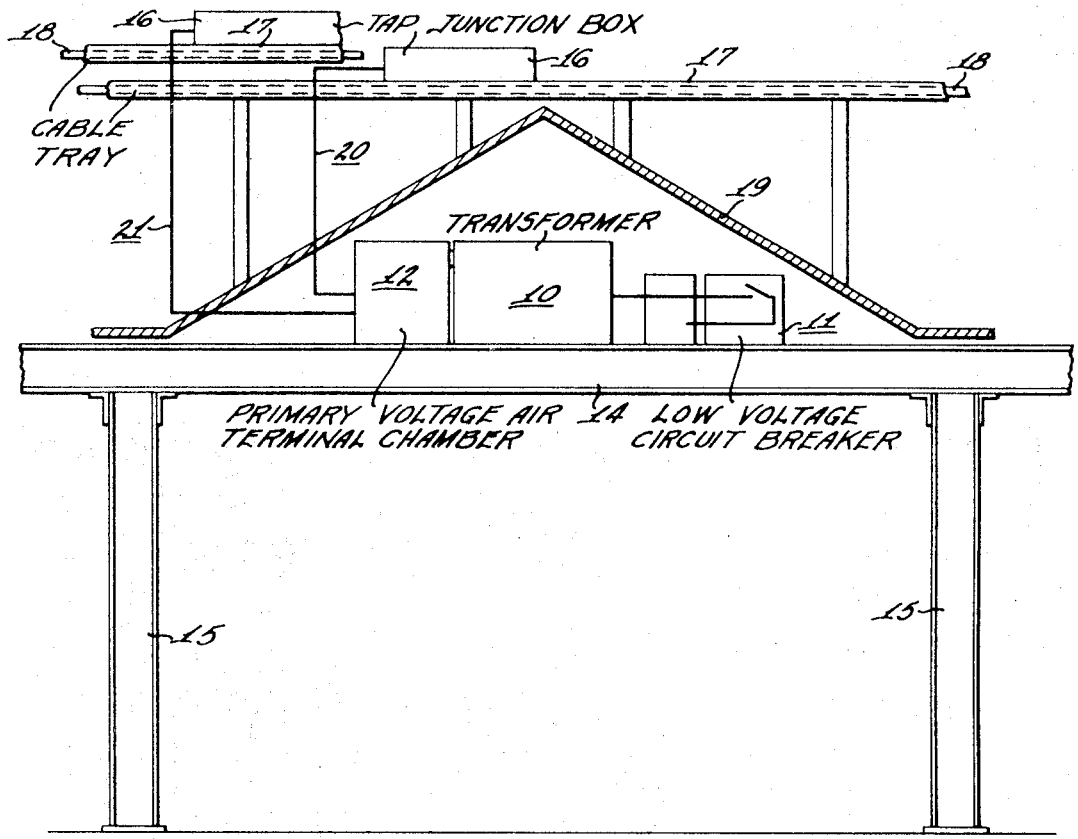
FIG. 1 is a schematic front view of an indoor unitary power center embodying the invention installed in an overhead location in an industrial plant.

Referring to FIG. 1 of the drawing, an indoor power center for an industrial plant comprises a power transformer 10, a low voltage circuit breaker 11 for the secondary distribution, and the primary voltage air terminal chamber 12 of the invention mounted on overhead, structural iron trusses 14 that are supported on vertical columns 15 which define a bay of an industrial plant. The indoor power center also includes tap junction boxes 16 which may be mounted on trays 17 for the three-phase primary feeder cables 18 supported from the roof 19 of the industrial plant. Electrical power may be transmitted throughout the entire industrial plant at 15,000 volts over the three-phase primary feeder cables 18 in the trays 17, and junction, or taps are made in the T- junction boxes 16 between the primary feeder cables 18 and primary tap cables 20 and 21 (shown only as single lines in FIG. 1) to transmit power at 15,000 volts to the air terminal chamber 12 mounted on the overhead trusses 14. The high voltage electrical power is converted in transformer 10 from 15,000 volts to desired secondary potential such as 440 volts service voltage or 2300 volts for secondary distribution.

The T-junction box 16 is disclosed in the copending application of Thomas H. Keogh et al., Ser. No. 673,148, filed Oct. 5, 1967, and having the same assignee as the present invention.

The primary voltage air terminal chamber 12 for the indoor power center comprises a unitary assembly of terminating means for the primary tap cables 20 and 21, primary circuit breakers 26 and 27 for the primary sources, current limiting fuses 39 for the power center transformer 10, and interlocking means between primary circuit breakers 26 and 27 and the fuses 39 which prevent simultaneous closing of both primary circuit breakers, prevents primary circuit breaker closing when the fuses 39 are removed, and also prevents removal of the fuses 39 when either primary breaker 26 or 27 is closed, and such air terminal assembly 12 occupies only a fraction of the space and weighs only a fraction of any arrangement of known components and is sufficiently small in size and light in weight to permit mounting on overhead trusses 14, thereby resulting in a substantial saving in floor space.

The air terminal chamber 12 is enclosed in a housing 22 (see FIGS. 2, 3, 4 and 6) of right angle prism configuration supported on a suitable base which may include a pair of elongated, horizontally spaced, structural iron channel members 23 (see FIGS. 2 and 3) disposed below the bottom wall of housing 22 and affixed at their ends by mounting brackets 24 secured to the web portion of a pair of the overhead trusses 14 of an industrial plant. Housing 22 of the primary voltage chamber 12 encloses a pair of three-phase, primary voltage load-break switches, or air circuit breakers 26 and 27 having elongated casings disposed back-to-back with their longitudinal axes in horizontal planes adjacent the bottom of housing 22 and each having three insulating bushings 28 projecting horizontally from the left end thereof and three insulating bushings 29 projecting horizontally from the right end thereof as shown in FIG. 2. The high voltage, three-phase tap cables 20 and 21 from a pair of high voltage sources such as the 15,000-volt primary feeder cables 18 in the cable trays 17 may terminate on the insulating bushings 28 of the primary circuit breakers 26 and 27, respectively.

The air circuit breakers 26 and 27 are opened and closed manually by operating handles 32A and 32B respectively (see FIGS. 2 and 6) accessible from the front of housing 22 to an operator on a catwalk (not shown) in the industrial plant. The power transformer 10 of the load center may include a casing 35 (see FIGS. 3 and 6) supported (by means not shown) on the trusses 14 and having three primary insulating bushings 36 extending horizontally therefrom through an aperture in the rear wall of housing 22 and into the interior of housing 22 and having terminal means 37 thereon which make electrical connection with metallic ferrules 38 on one end of three current limiting fuses 39 disposed horizontally above circuit breakers 26 and 27. Bus bars 42 (see FIGS. 2, 5, 6 and 13) electrically common the corresponding phase terminal means on insulating bushings 29 extending horizontally from the right end of both circuit breakers 26 and 27 (as seen in FIG. 2) and connect them to pivoted, vertically extending copper terminal bars 45 resiliently held against metallic ferrules 46 on the opposite end of current limiting fuses 39. The current limiting fuses 39 are supported within movable fuse trays 48 of suitable high dielectric strength insulating material and clamped under pressure between the terminal bars 45 and the terminal means 37 on transformer bushings 36 by elongated insulating rods 49 which normally are resiliently urged against the terminal bars 45.

The movable fuse trays 48 are affixed by pins 52 (see FIG. 14) to rectangular fuse tray covers 53 to form fuse drawers 54 which are reciprocable horizontally into and out of housing 22 through openings 55 (see FIGS. 13 and 14) in front wall 56 of housing 22 between the normal position shown in full lines, wherein the fuses 39 engage the terminal means 37 on the transformer bushings 36, and the open position shown in dot-dash lines in FIG. 6 wherein the fuses 39 may be changed. Interlocking means described hereinafter prevent withdrawal of fuse drawers 54 until the operating handles 32A and 32B of both circuit breakers 26 and 27 are in open position. The insulating rods 49 are reciprocated within movable fuse trays 48 by externally threaded shafts 58 (see FIGS. 13 and 14) engaged within internally threaded openings 59 in rectangular covers 53 and having hand knobs 60 integral therewith external of housing 22. Resilient means for applying axial pressure against each fuse 39 operatively connects shaft 58 and insulating rod 49 and includes a first cup-shaped member 62 affixed to shaft 58 by a snap ring, a smaller diameter second cup-shaped member 63 affixed by a snap ring to insulating rod 49 and telescoped within first cup-shaped member 62 so their open ends face each other, and a compression spring 64 disposed within the telescoped members 62 and 63.

Figure 16:
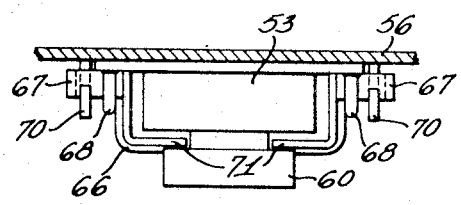
FIGS. 15 and 16 are front and plan views respectively of the fuse tray cover.
Figure 15:
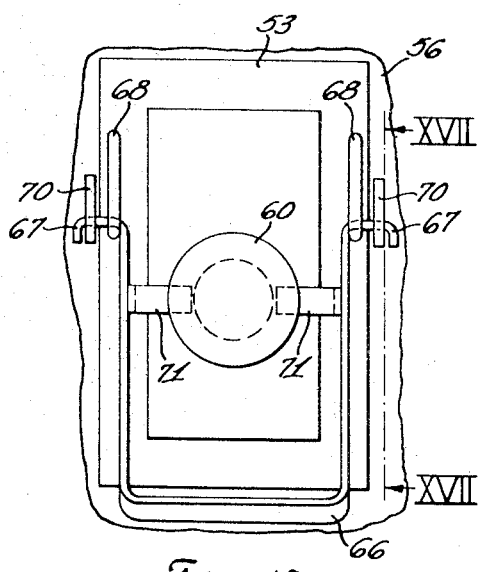
Figure 17:
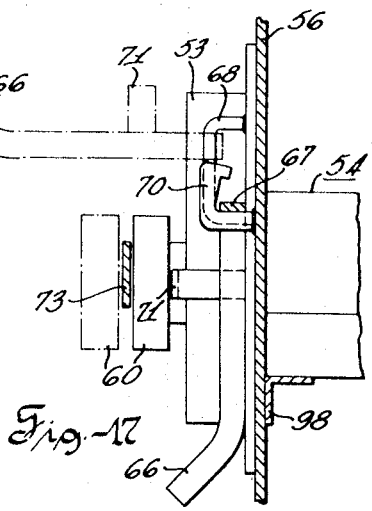
FIG. 17 is a view taken along line XVII—XVII of FIG. 15 showing the closed and open positions of the fuse drawer latches in full and in dot-dash lines respectively.

The fuse drawers 54 are normally locked to housing 22 by U-shaped drawer latches 66 (see FIGS. 15, 16 and 17) having horizontally extending ears 67 which protrude through eyes 68 on rectangular covers 53 and fit behind hook-shaped catches 70 on casing front wall 56. Fuse drawer latches 66 can be lifted to the dot-dash line position shown in FIG. 17 to remove the ears 67 thereon from behind the hook-shaped catches 70, but laterally projecting lugs 71 on latches 66 normally fit behind the rotatable fuse tightening knobs 60 and prevent lifting of latches 66. Ganged interfering arms 73 (see FIGS. 2, 3 and 14) are rotatable about parallel axes and normally disposed in a horizontal interfering position in front of the fuse tightening knobs 60 to prevent rotation thereof in a direction to release pressure on current limiting fuses 39. Until both circuit breaker operating handles 32A and 32B are in the open position, the ganged interfering arms 73 are prevented by interlocking means described hereinafter from being rotated to the vertical open position shown in dot-dash lines in FIG. 2. After the ganged arms 73 are rotated to the vertical open position, the rotatable fuse tightening knobs 60 can be rotated in a direction to move the shafts 58 outward of casing 22 until the knobs 60 are in the dot-dash line position shown in FIGS. 14 and 17 wherein they no longer interfere with lugs 71 on drawer latches 66, thereby permitting the latches 66 to be pivoted upward until the hook portions 77 are out of the catches 70 to allow withdrawal of the fuse drawers 54 to the open position shown in dot-dash lines in FIG. 6. Movement of a shaft 58 outward of casing 22 by rotating hand knob 60 releases the pressure with which the compression spring 64 holds the fuse 39 against the terminal means 37 of transformer bushing 36.

The three-phase primary tap cables 20 and 21 have three conductors 75 (see FIG. 3) which may be of 4/0 size each of which is surrounded by concentric layers of insulation 76 (see FIG. 3), semiconductive material 77, and a metallic grounding sheath 78. The insulation and semiconductive layers 76 and 77 are cut back and the edge of the semiconductive material 77 where the equipotential lines concentrate and the voltage gradient is the highest is covered with a mass 79 of moldable semiconductive material commercially available under the mark Airseal to reduce the voltage gradient at this point. Flexible insulating boots 80 cover the joints between the cable conductors 75 and the bushing terminals and fit snugly at their ends over the bushings 28 and the insulation of the conductors.

Figures 4, 21:
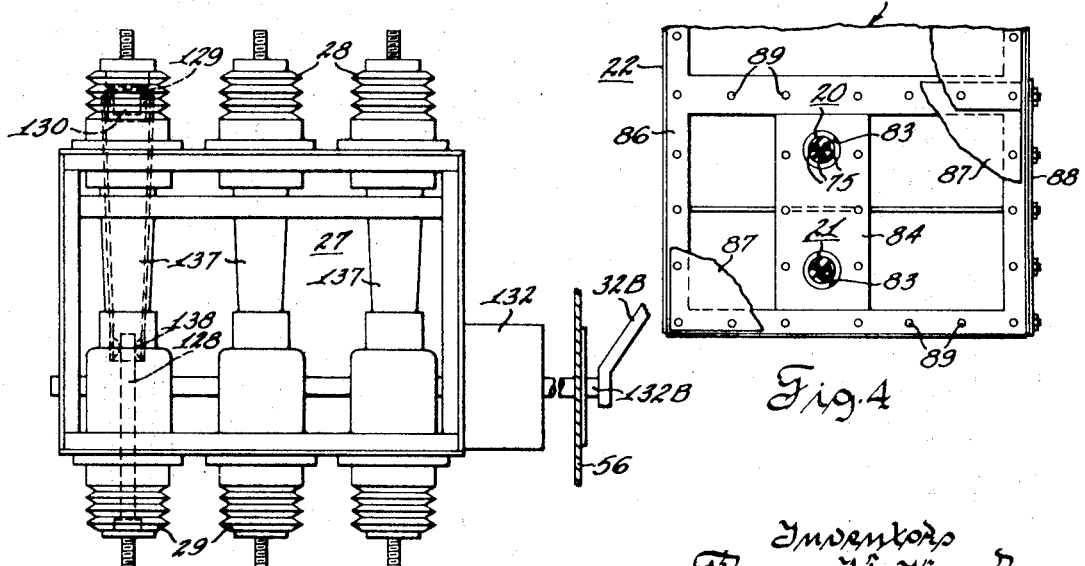
FIG. 4 is a view taken along line IV—IV of FIG. 2.
FIG. 21 is a view taken along line XXI—XXI of FIG. 6 with a wall of the air circuit breaker removed.
Figure 5:
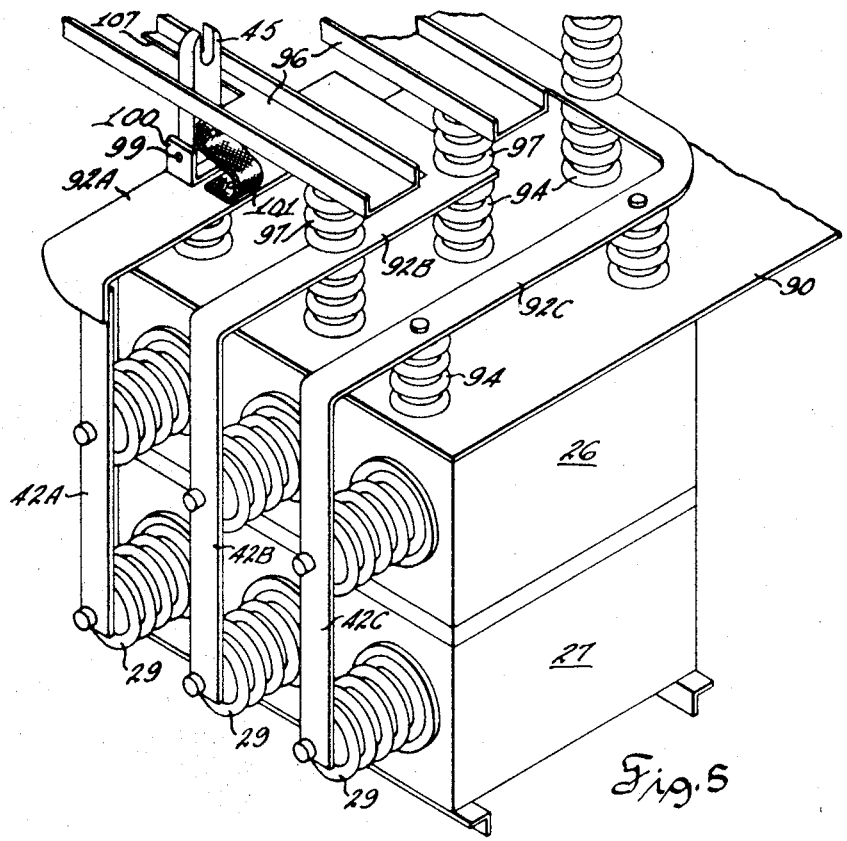
FIG. 5 is a perspective view of the circuit breakers and bus bar connections between such breakers and the primary fuses of the apparatus of FIG. 2.
Figures 11, 12:
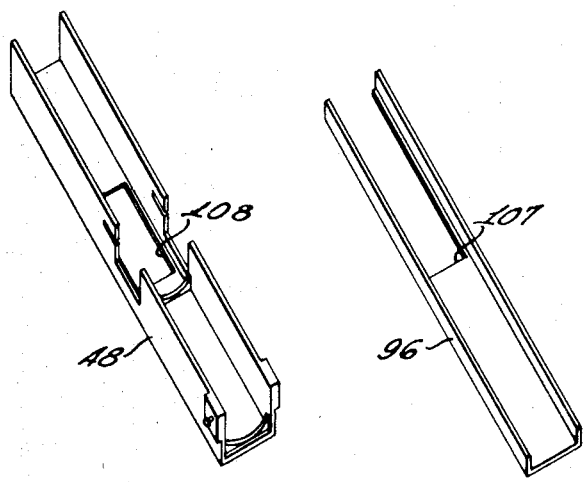
FIGS. 11 and 12 are perspective views respectively of the fixed and movable fuse trays of the apparatus of FIGS. 2–9.

The cables 20 and 21 have outer layers of cable armor 81 which is cut back and extends into and is locked to a conventional cable terminator 82. The cable terminators 82 extend through vertically spaced cable entrance ports 83 in the left sidewall 84 of housing 22 (as seen in FIGS. 2 and 4) and are affixed to housing 22 with a hermetic seal by a resilient gasket and a nut 85 engaging external threads on cable terminator 82. The grounding sheaths 78 from the three conductors 75 of each tap cable 20 and 21 are electrically connected together internally of housing 22 and to a copper ground pad (not shown) on a wall of housing 22. Housing 22 preferably has a skeletal framework of elongated members such as angle iron members 86 (see FIG. 4), and removable panels 87 in the left end wall and removable panels 88 (see FIG. 3) in the front wall 56 are supported on studs 89 affixed to elongate members 86 to permit ready access to the cable terminations by the workman.

An L-shaped barrier 90 which may be of sheet steel material extending between front and rear walls of housing 22 above upper circuit breaker 26 separates the air circuit breakers 26 and 27 from the current limiting fuses 39. The bus bars 42A, 42B and 42C have vertical portions (see FIGS. 5 and 6) which are connected to and electrically common the corresponding phase terminals on the insulating bushings 29 of both air breakers 26 and 27 and are bent over into horizontal portions 92 supported on standoff insulators 94 mounted on barrier 90. The horizontal portions 92A, 92B and 92C (see FIG. 5) of bus bars 42A, 42B and 42C are in the same horizontal plane. The horizontal portion 92A of bus bar 42A is a flat conductive plate electrically connected to vertical bus bar portion 42A, and the portions 92B and 92C of bus bars 42B and 42C are integral therewith and L-shaped and of different lengths and terminate in alignment with portion 92A. Fixed insulating trays 96 of channel cross section for supporting the movable fuse trays 48 extend in a horizontal direction between the front and rear walls of housing 22 and are supported on standoff insulators 97 (see FIGS. 5, 6 and 13) mounted on the horizontal bus bar portions 92B and 92C and by L-shaped brackets 98 (see FIGS. 6 and 13) on the front wall 56 of housing 22. Pivot pins 99 (see FIGS. 5, 6 and 13) extending through the legs of U-shaped hinge brackets 100 secured adjacent the ends of horizontal bus bar portions 92A, 92B and 92C pivotally mount the vertically extending copper terminal bars 45 which abut against the ferrules 46 on current limiting fuses 39. The terminal bars 45 are electrically connected to horizontal bus bar portions 92A, 92B and 92C by flexible copper straps 101.

The insulating rods 49 are operatively connected by radial pins 104 (see FIG. 14) to U-shaped metal brackets 105 carrying insulating shoes 106 which abut against copper terminal bars 45. The terminal bars 45 fall to an inclined position shown in dot-dash lines in FIG. 13 when the fuse drawers 54 are removed, and the insulating shoes 106 extend downward through apertures 107 and 108 in fixed trays 96 and movable fuse trays 48 respectively and actuate the terminal bar 45 upward into engagement with ferrule 46 on current limiting fuse 39 when fuse drawers 54 are again inserted into housing 22. After a fuse drawer 54 is locked to housing 22 by latch 66, hand knob 60 on threaded shaft 58 is then turned until compression spring 64 exerts pressure against insulating shoe 106 and resiliently clamps current limiting fuse 39 between copper terminal bar 45 and terminal means 37 on transformer insulating bushing 36.

Figure 18:
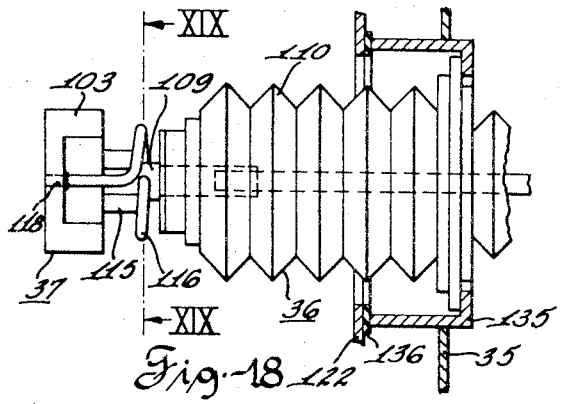
FIG. 18 is an enlarged view taken along line XVIII—XVIII of FIG. 3.
Figure 19:
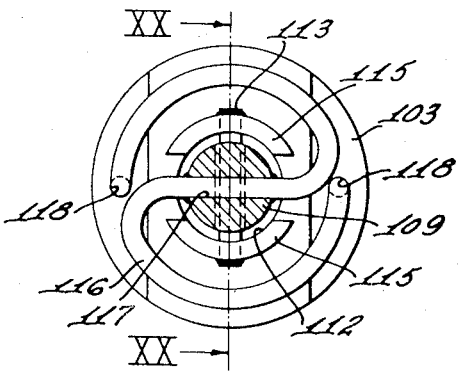
FIG. 19 is a view taken along line XIX—XIX of FIG. 18.
Figure 20:
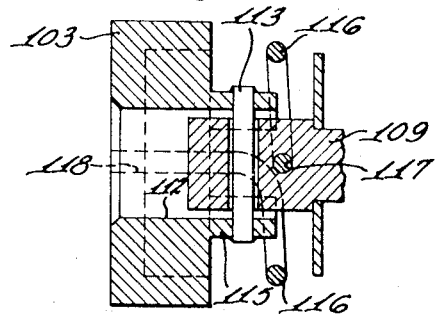
FIG. 20 is a view taken along line XX—XX of FIG. 19.

Terminal means 37 have circular metallic movable contacts 103 (see FIGS. 18–20) which abut against the ferrules 38 on current limiting fuses 39 and have limited universal motion relative to the transformer insulating bushings 36 and provide high current carrying engagement with the ferrules 38 even when fuses 39 are not in exact axial alignment with bushings 36. Conductive studs 109 extending axially from the porcelain insulator members 110 of transformer insulating bushings 36 protrude into axial bores 112 in the movable contacts 103 with a relatively loose fit and are affixed thereto by pins 113 extending radially through arcuate ear portions 115 on movable contacts 103 and extending with a loose fit through an aperture in conductive stud 109, and such loose fit permits limited movement of contacts 103 in two mutually perpendicular directions relative to studs 109. A flexible current transfer copper lead 116 extends through a radial aperture 117 in stud 109, and the ends of flexible lead 116 are bent into loops and secured by suitable means such as silver solder within apertures 118 in movable contact 103 extending parallel to the axis thereof.

Leveling screws 119 (see FIG. 2) may be provided between the bottom wall of housing 22 and the structural iron channels 23 of the housing base to permit leveling of housing 22 and alignment thereof with the transformer casing 35. Short horizontal guide lugs 120 (see FIGS. 3 and 6) welded in a triangular arrangement on transformer casing 35 fit within annular collars 121 affixed on the rear wall 122 of housing 22 to align the transformer bushing terminals 37 with the fuse ferrules 38. Threaded studs 123 on the rear wall 122 of housing 22 protrude through apertures 124 in metallic plates 125 welded to transformer casing 35, and nuts are threaded on the studs 123 to affix transformer casing 35 to housing 22. Cylindrical aligning members 126 disposed within the apertures 124 have oblong axial openings 127 therein (shown in dotted lines in FIG. 3) which receive the studs 123 and are manually rotatable within the apertures 124 to align the studs 123 on housing 22 with the apertures 124 in plates 125. Transformer bushings 36 protrude from a rectangular-in-cross section recess 135 in transformer casing 35, and a gasket 136 (see FIG. 18) may be disposed between the rear wall 122 of housing 22 and the portion of transformer casing 35 defining the recess 135 to prevent entry of dust into housing 22.

The primary voltage, air break circuit breakers 26 and 27 may be commercially available three-phase, three-pole, single throw 600-ampere load break switches rated at 13.2 kilovolts, 40,000 amperes symmetrical make and latch, and 60,000 amperes momentary, and sold under the marks Isolator and Iso-Quensor. The specific switches do not constitute a part of the present invention and are shown somewhat schematically in FIG. 21 as including three movable tubular porcelain members 137 each of which encloses a first tulip type contact 138 adapted to maintain continuous engagement with an axially extending bayonet contact 128 supported on insulating bushing 29 as porcelain members 137 are reciprocated axially and a second tulip type contact 129 electrically connected to contact 138 and adapted to engage and disengage a bayonet type contact 130 mounted on insulating bushing 28. The porcelain members 137 are reciprocated axially between open and closed position by a spring type stored energy operator 132, shown only in block form, when a switch operating shaft 132A or 132B is rotated by manual movement of switch operating handle 32A or 32B.

The switch operating shafts 132A and 132B for circuit breakers 26 and 27 carry eccentric cams 140A and 140B (see FIGS. 6 and 7) respectively interior of housing 22. Cam followers 141A and 141b affixed to elongated cam follower rods 142 are urged into continuous engagement with cams 140A and 140B by compression springs 144 which abut at one end against brackets 145 affixed to housing front wall 56 (see FIGS. 7 and 10) and at their opposite end against washers 147 disposed against pins 148 protruding through the rods 142. The cam follower rods 142 protrude through keyhole slots 150 (see FIG. 8) in a vertical, elongated, longitudinally reciprocable interlocking bar 152. Horizontal pins 153 affixed to the interior of housing wall 56 and extending through elongated slots 155 in interlocking bar 152 guide the bar 152 as it reciprocates longitudinally and interlocking bar 152 is normally resiliently urged to its lowermost position, corresponding to the open position of both circuit breakers 26 and 27, by a compression spring 157. Spring 157 surrounds a bolt 158 which slidably extends through an aperture in a horizontal position 160 at the lower extremity of interlocking bar 152, and the head of bolt 158 abuts against a bracket 159 secured to the front wall 56 of housing 22 to prevent movement of bolt 158. Compression spring 157 abuts at one end against a nut threaded on bolt 158 and at the opposite end against horizontal portion 160 of interlocking bar 152 and urges interlocking bar 152 to its lowermost position.

Cam followers 141 have internally threaded cylindrical portions which receive bolts that bear against the cams 140 to permit adjustment of the interlock. The cylindrical portions of the cam followers 141A and 141B are of larger diameter than elongated rods 142 and can protrude through the circular portion of the keyhole slots 150 but cannot protrude through the elongated portion of the keyhole slots 150. The portions of eccentric cams 140A and 140B of smallest diameter engage the cam followers 141A and 141B when circuit breakers 26 and 27 are in the open position, at which time the springs 144 urge cam followers 141 against cams 140A and 140B so that the cam followers 141 are not within the keyhole slots 150, thereby permitting interlocking bar 152 to be moved vertically upward to allow withdrawal of fuse drawers 54 and fuses 39 from housing 22 as hereinafter described. When either circuit breaker 26 or 27 is closed to electrically connect a high voltage tap cable 20 or 21 through fuses 39 to transformer 10, the largest diameter portion of the eccentric cams 140A or 140B engages the corresponding cam follower 141A or 141B and pushes it through the circular portion of the associated keyhole slot 150, thereby interfering with upward movement of interlocking bar 152 and preventing withdrawal of fuse drawers 54 from housing 22.

The air terminal chamber of the invention also has interlocking means to prevent simultaneous closing of both circuit breakers 26 and 27, thereby assuring that one high voltage tap cable 20 is never directly connected to the other high voltage tap cable 21. At the end opposite the cam followers 141, each of the elongated rods 142 has an axially spaced pair of pins 162 extending therethrough disposed on opposite sides of a vertical "rocking" bar 163 whose midpoint is positioned adjacent a stop pin, or "defeater" pin 164 affixed to front wall 56 of housing 22. The pins 162 operatively connect elongated cam follower rods 142 to rocking bar 163 while permitting pivotal movement therebetween, and defeater pin 164 allows rocking bar 163 to pivot when one end thereof is moved by an elongated rod 142, but defeater pin 164 interferes with and prevents translation of rocking bar 163 transverse to its axis. When either switch operating handle 32A or 32B is actuated to closed position, thereby rotating the corresponding eccentric cam 140A or 140B and actuating the associated cam follower 141A or 141B and cam follower rod 142 longitudinally, the rocking bar 163 pivots about defeater pin 164. The other switch operating handle 32A or 32B cannot be operated to closed position thereafter because the defeater pin 164 interferes with translation of rocking bar 163 transverse to its axis, thereby preventing longitudinal reciprocation of the other cam follower rod 142 and obstructing movement of the associated eccentric cam 140A or 140B. It will thus be appreciated that rocking bar 163 and defeater pin 164 block simultaneous closing of both circuit breakers 26 and 27 and thus positively prevents accidental connection of one primary tap cable 20 or 21 to the other.

Defeater pin 164 extends through an aperture in housing front wall 56 and has a head which is resiliently urged against a cup-shaped projection 166 on wall 56 by a compression spring 167 (see FIG. 9). The compression spring 167 abuts at one end against the interior surface of the cup-shaped projection 166 and at its other end against a washer 168 disposed against a pin extending through defeater pin 164, and compression spring 167 normally urges defeater pin 164 to the position shown in FIGS. 7, 9 and 10 where it obstructs translation of rocking bar 163 transverse to its length, thereby preventing simultaneous movement of both switch operating handles 32A and 32B simultaneously to the closed position. If it is desired to simultaneously close both circuit breakers 26 and 27, defeater pin 164 is manually pulled against the force of compression spring 167 until defeater pin 164 no longer interferes with transverse translation of rocking bar 163, thereby permitting both cam follower rods 142 to move longitudinally and allowing both eccentric cams 140A and 140B to rotate to the position wherein the largest diameter portion thereof engages the cam followers 141A and 141B.

Rocking bar 163 is normally disposed within a notch 169 in the end of defeater pin 164 (see FIG. 9). When defeater pin 164 is manually pulled out and both switch handles 32A and 32B are moved to closed position, rocking bar 163 is translated transversely and the end of defeater pin 164 rests against the rocking bar 163. When one switch handle 32A or 32B is now moved toward open position, the rocking bar 163 is again translated transversely, and defeater pin 164 is urged by spring 167 to the normal position shown in FIG. 9 wherein rocking bar 163 is within notch 169, thereby preventing return of the switch to closed position and requiring that the switch be actuated to open position.

Notch 169 presents a flat surface to rocking bar 163 which minimizes the angular movement of rocking bar 163 when one switch handle 32 is moved between open and closed position, thereby assuring that the cam followers 141 are properly located relative to the keyhold slots 150 in interlocking bar 152 and making the interlock more positive.

The upper end of interlocking bar 152 is affixed to the connecting rod 170 of a linkage having three parallel crank arms 172 each of which is pivotally connected to one end of a crank 174. The cranks 174 are affixed to shafts 176 which rotatably protrude through housing front wall 56 and through sleeve bearings 178 affixed to wall 56. Exterior of housing 22, the shafts 176 are secured to the interfering arms 73 which are normally disposed horizontally in front of hand knobs 60 and thus prevent withdrawal of fuse trays 54 from housing 22. One interfering arm 73 is provided with a handle 181 (see FIGS. 3, 7 and 10) which permits manual rotation of the interfering arms 73 (which are mechanically ganged through connecting rod 170) from the solid line horizontal position shown in FIG. 2, where they obstruct unthreading of hand knobs 60, to the vertical dot-dash line position shown in FIG. 2 wherein the hand knobs 60 can be rotated to turn the threaded shafts 58 (see FIGS. 13 and 14) in the internally threaded openings 59 in rectangular covers 53, thereby longitudinally translating the insulating rods 49 to release the pressure of springs 64 against current limiting fuses 39 and moving hand knobs 60 to the dot-dash line position shown in FIGS. 14 and 17 where the fuse drawer latches 66 can be lifted (to the dot-dash line position shown in FIG. 17) to remove the ears 67 from behind the hook shaped catches 70, thereby permitting withdrawal of fuse drawers 54 from housing 22 (to the dash-dot line position shown in FIG. 6).

A bolt 185 threaded through a bracket 186 (see FIGS. 2 and 3) on housing front wall 56 normally interferes with one of the ganged interfering arms 73 and prevents movement thereof from the horizontal position shown in full lines in FIG. 2, where they interfere with outward movement of hand knobs 60, to the vertical position shown in dot-dash lines wherein hand knobs 60 can be rotated to free the fuse drawer latches 66 so that fuse drawers 54 can be withdrawn from housing 22 as seen in FIG. 6. When fuse drawers 54 are closed and interfering arms 73 are in their normal horizontal position, the linkage of parallel crank arms 172 and connecting rod 170 is in the uppermost position shown in full lines in FIG. 7, thereby raising interlocking bar 152 to its uppermost position wherein the circular portion of keyhole slots 150 are opposite the cam followers 141A and 141B. It will be appreciated that in this horizontal position of interfering arms 73 and uppermost position of interlocking bar 152, the eccentric cams 140A and 140B can be rotated to push the cam followers 141A and 141B through the keyhole slots 150, and consequently one switch actuating arm 32A or 32B can be rotated from open to closed position to close the corresponding circuit breaker 26 or 27 and connect one high voltage tap cable 20 or 21 through fuses 39 to transformer 10. When either circuit breaker 26 or 27 is closed, the associated cam follower 141A or 141B protrudes through the circular portion of a keyhole slot 150, thereby obstructing downward movement of interlocking bar 152, preventing movement of linkage including crank arms 172, obstructing rotation of interfering arms 73 and preventing withdrawal of fuse drawers 54 from housing 22 as long as one circuit breaker 26 or 27 is closed. When the circuit breaker is opened, the associated cam follower 141A or 141B is removed from the keyhole slot 150, the interlocking bar 152 can be lowered because the cam follower rods 142 slide in the elongated portion of the keyhole slots 150, and interfering arms 73 can be rotated by means of handle 181 to lower the linkage to the lowermost position shown in dot-dash lines in FIG. 7, thereby permitting unthreading of hand knobs 60 and withdrawal of fuse drawers 54 from housing 22 and also interfering with movement of either circuit breaker 26 or 27 to the closed position by the elongated portion of keyhole slots 150 preventing longitudinal movement of cam followers 141A and 141B.

While only a single embodiment of the invention has been illustrated and described, many modifications and variations thereof will be readily apparent to those skilled in the art, and consequently it is intended in the appended claims to cover all such modifications and variations thereof which are within the true spirit and scope of the invention.

The embodiments of the invention in which an exclusive property or privilege is claimed are defined as follows:

1. In combination,
a housing,
a plurality of fuse drawers of insulating material disposed on a common plane and being reciprocable into and out of said housing,
an elongated fuse positioned on each of said fuse drawers,
pivoted metallic connector member electrically engageable with one end of said fuses when said drawers are inserted into said housing,
said housing having an opening therein through which the opposite end of said fuses are exposed,
an electrical apparatus disposed adjacent said housing and having a plurality of insulating bushings in said common plane and in alignment with said fuses each of which is provided with terminal means protruding through said opening in said housing into engagement with the opposite end of one of said fuses,
fuse clamping means on each said fuse drawer operable from the exterior of said housing, when said fuse drawer is inserted into said housing, for resiliently urging said connector members against said one end of said fuse to thereby push said opposite end of said fuse against said terminal means on said bushings, and
means for releasably latching each of said fuse drawers to said housing.

2. In the combination of claim 1 wherein said fuse latching means includes a latching member on each said fuse drawer movable between a latching position wherein said drawer is held against withdrawal from said housing and a released position wherein said drawer may be withdrawn from said housing and wherein said fuse clamping means interferes with and holds said latching member in said latching position when said fuse is clamped against said terminal means on said insulating bushing.

3. In the combination of claim 1 and including means on each said insulating bushing for providing universal motion of said terminal means relative to said bushing and for simultaneously maintaining continuous electrical connection between said terminal means and said electrical apparatus, whereby said terminal means is in current transfer relation with the corresponding fuse even when said bushings and fuses are slightly misaligned.

4. In the combination of claim 3 wherein said terminal means includes a metallic stud extending axially of said bushing and having an aperture therethrough and a movable metallic contact having an axial bore loosely receiving said stud and a pair of ears on diametrically opposite sides thereof extending parallel to the axis of said stud, and said means for providing universal motion includes a metallic pin extending through said ears and protruding with a loose fit through said aperture in said stud and a flexible conductor affixed to said stud and to said movable contact.

5. In the combination of claim 2 wherein said housing has a plurality of stationary insulating trays positioned in said common plane and said fuse drawers are supported on and slidable on said trays.

6. In the combination of claim 5 wherein said apparatus is an electrical transformer having horizontally extending insulating bushings extending through said opening and carrying said terminal means, said common plane and said trays and drawers are horizontal, and said fuses are elongated and have metallic ferrules at said one end which engage said connector members and at said opposite end which engage said terminal means.

7. In the combination of claim 6 wherein said common plane is horizontal and said trays and fuse drawers have registering apertures therein when said fuse drawers are inserted into said housing and said pivoted connector members protrude through said registering apertures into engagement with said one end of said fuses.

8. In the combination of claim 1 wherein each said fuse clamping means includes an elongated insulating rod having one end disposed adjacent said connector member when said fuse drawer is inserted into said housing, means including a rotatable threaded member accessible from the exterior of said housing for actuating said rod longitudinally to push said connector member against said one end of said fuse, and spring means disposed between said insulating rod and said threaded member.

9. In the combination of claim 8 wherein each fuse drawer has a front wall with a threaded opening therein and said rotatable member of said rod actuating means is a shaft having external threads engaged within said threaded opening and a hand knob exterior of said housing.

10. In the combination of claim 8 wherein said spring means of said fuse clamping means includes a pair of cup-shaped members telescoped together with open ends facing each other and one of which operatively engages said threaded member and the other of which operatively engages said insulating rod and a cylindrical spring disposed within said telescoped cup-shaped members and compressed therebetween and urging them apart.

11. In the combination of claim 2 wherein each fuse drawer latching means includes an eye on said fuse drawer positioned adjacent a hook portion on said housing when said fuse drawer is closed and said latching member has an ear extending through said eye and engageable with said hook portion when said drawer is inserted into said housing.

12. In the combination of claim 9 wherein said threaded shaft of said fuse clamping means is rotatable in a direction to load said spring means and resiliently urge said fuse against said terminal means on said insulating bushing and to a position wherein said hand knob interferes with and holds said latching member against motion and prevents removal of said ear from said hook portion, whereby said fuse drawer cannot be withdrawn from said housing until said fuse clamping means is released.

13. In the combination of claim 8 wherein each said pivoted connector member falls free of the corresponding tray and drawer when said fuse drawer is withdrawn from said housing and each said fuse clamping means includes shoe means rotatably connected to the end of said insulating rod and depending through said registering apertures in said drawer and tray for engaging said connector member and pivoting it upward into engagement with said one end of said fuse when said fuse drawer is inserted into said housing, said means for longitudinally actuating said insulating rod being adapted to urge said shoe means against said connector member and said connector member against said one end of said fuse to clamp said fuse against said terminal means on said insulating bushing.

14. In the combination of claim 9 wherein said hand knob holds said latching member in said latching position when said threaded member is rotated sufficiently to urge said opposite end of said fuse against said terminal means on said insulating bushing.

15. In the combination of claim 7 wherein each said fuse clamping means includes an elongated insulating rod having one end disposed adjacent said connector member when said fuse drawer is inserted into said housing, means including a rotatable threaded member accessible from the exterior of said housing for actuating said rod longitudinally to push said connector member against said one end of said fuse, and spring means disposed between said insulating rod and said threaded member.

16. In the combination of claim 15 wherein each fuse drawer has a front wall with a threaded opening therein and said rotatable member of said rod actuating means is a shaft having external threads engaged within said threaded opening and a hand knob exterior of said housing.

17. In the combination of claim 16 wherein each fuse drawer latching means includes an eye on said fuse drawer positioned adjacent a hook portion on said housing when said fuse drawer is closed and said latching member has an ear extending through said eye and engageable with said hook portion when said drawer is inserted into said housing.

18. In the combination of claim 16 wherein said spring means of said fuse clamping means includes a pair of cup-shaped members telescoped together with open ends facing each other and one of which operatively engages said threaded member and the other of which operatively engages said insulating rod and a cylindrical spring disposed within said telescoped cup-shaped members and compressed therebetween and urging them apart.

19. In the combination of claim 17 wherein said threaded shaft of said fuse clamping means is rotatable in a direction to load said spring means and resiliently urge said fuse against said terminal means on said insulating bushing and to a position wherein said hand knob interferes with and holds said latching member against motion and prevents removal of said ear from said hook portion, whereby said fuse drawer cannot be withdrawn from said housing until said fuse clamping means is released.

References Cited

UNITED STATES PATENTS

| | | | |
|---|---|---|---|
| 3,299,236 | 1/1967 | Barker | 337—189 |
| 3,274,356 | 9/1966 | Godfrey | 337—189 |
| 1,620,814 | 3/1927 | Getchell | 337—10 |
| 1,601,926 | 10/1926 | Simpson | 337—196 XR |

BERNARD A. GILHEANY, Primary Examiner

D. M. MORGAN, Assistant Examiner

U.S. Cl. X.R.

337—8, 196, 205, 210, 214

PO-1050
(5/69)

UNITED STATES PATENT OFFICE
CERTIFICATE OF CORRECTION

Patent No. 3,530,418         Dated September 22, 1970

Inventor(s) Thomas H. Keogh and Adolph E. Krupit

It is certified that error appears in the above-identified patent and that said Letters Patent are hereby corrected as shown below:

In the claims, column 9, line 53, "member" should read -- members -- .

SIGNED AND SEALED
DEC 1 - 1970

(SEAL)
Attest:

Edward M. Fletcher, Jr.
Attesting Officer

WILLIAM E. SCHUYLER, JR.
Commissioner of Patents